Patented Oct. 28, 1952

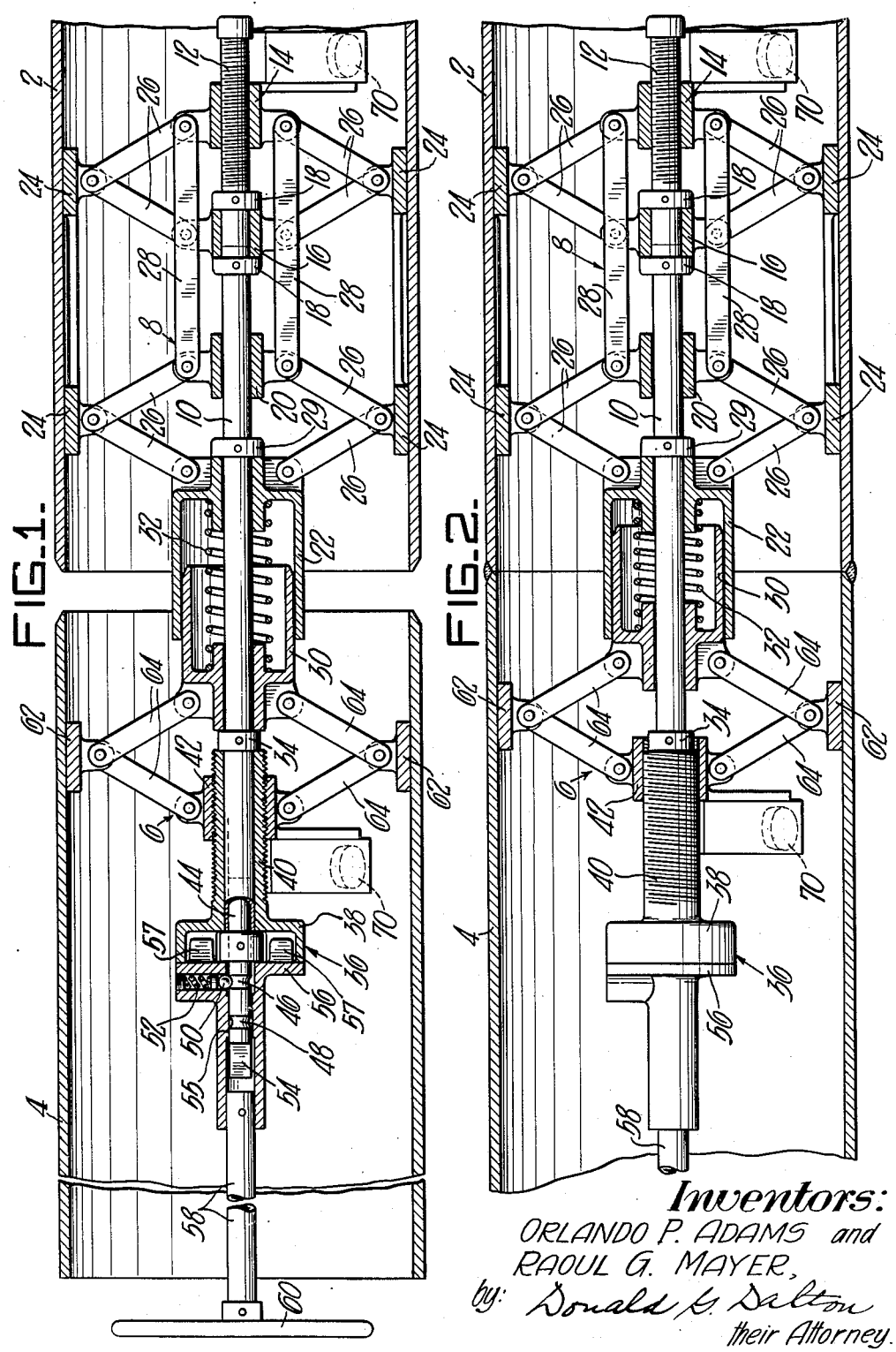

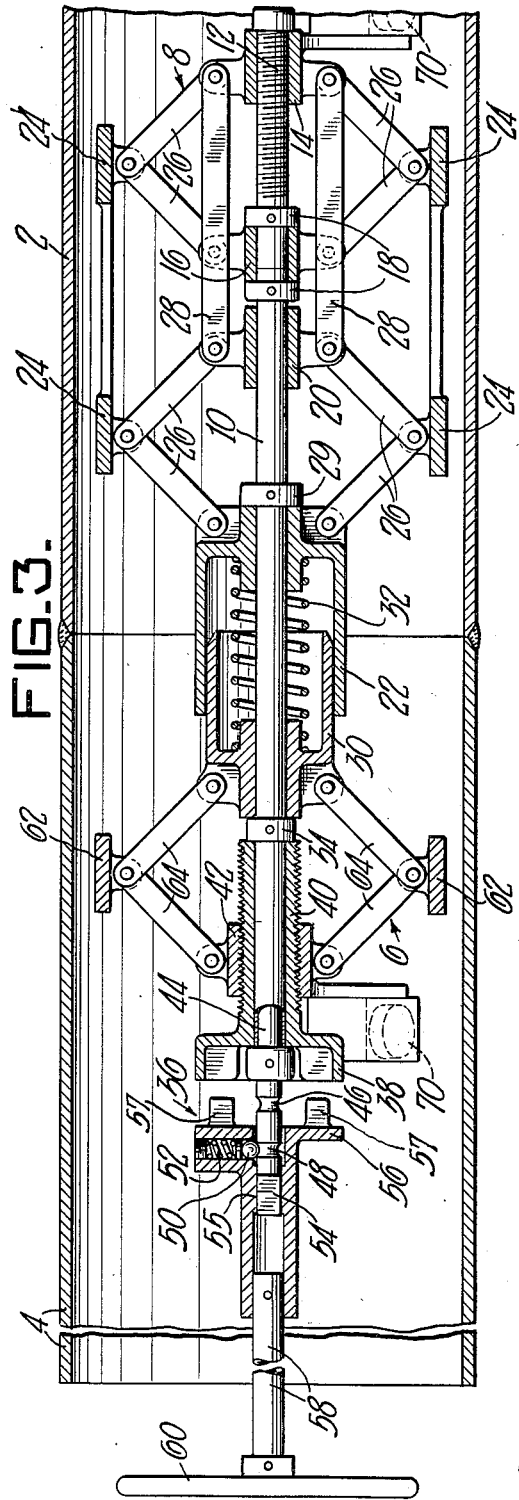

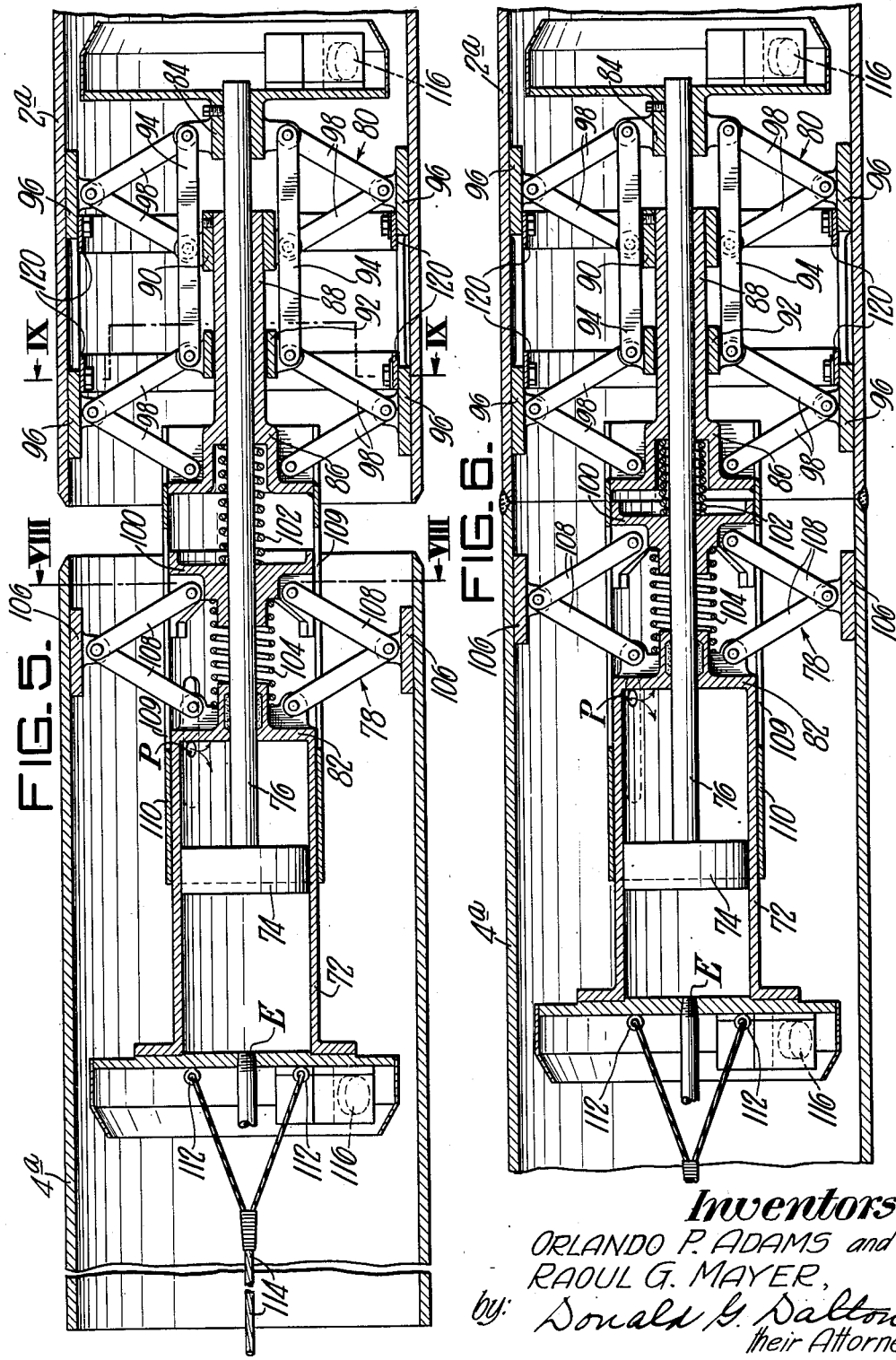

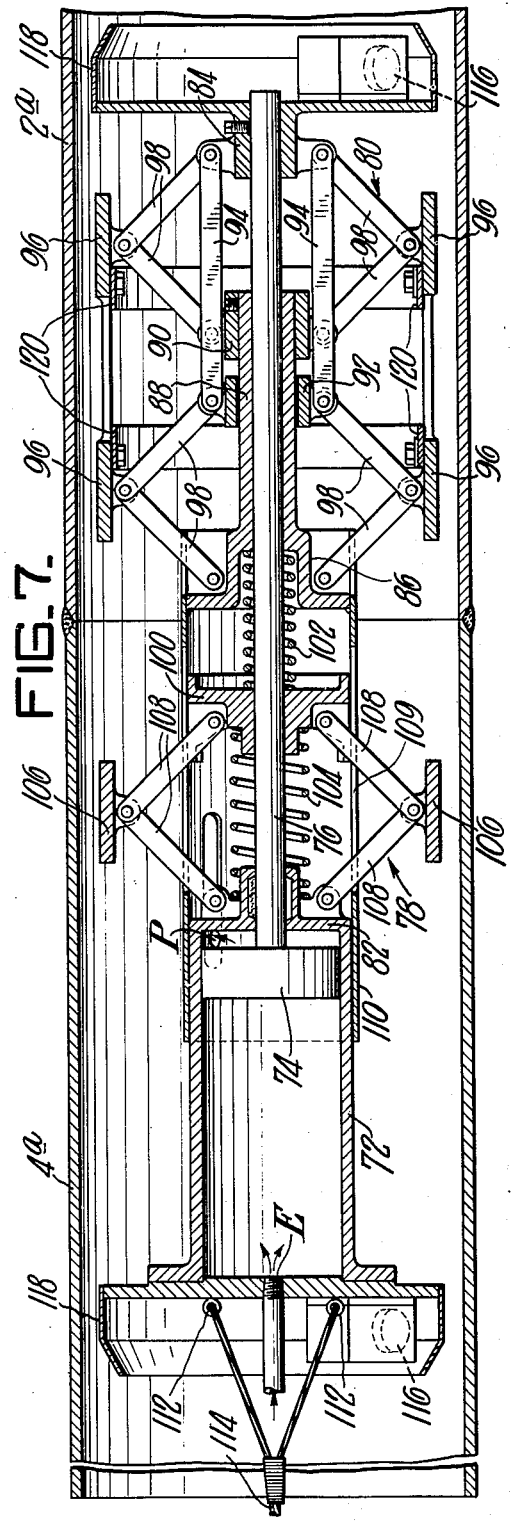

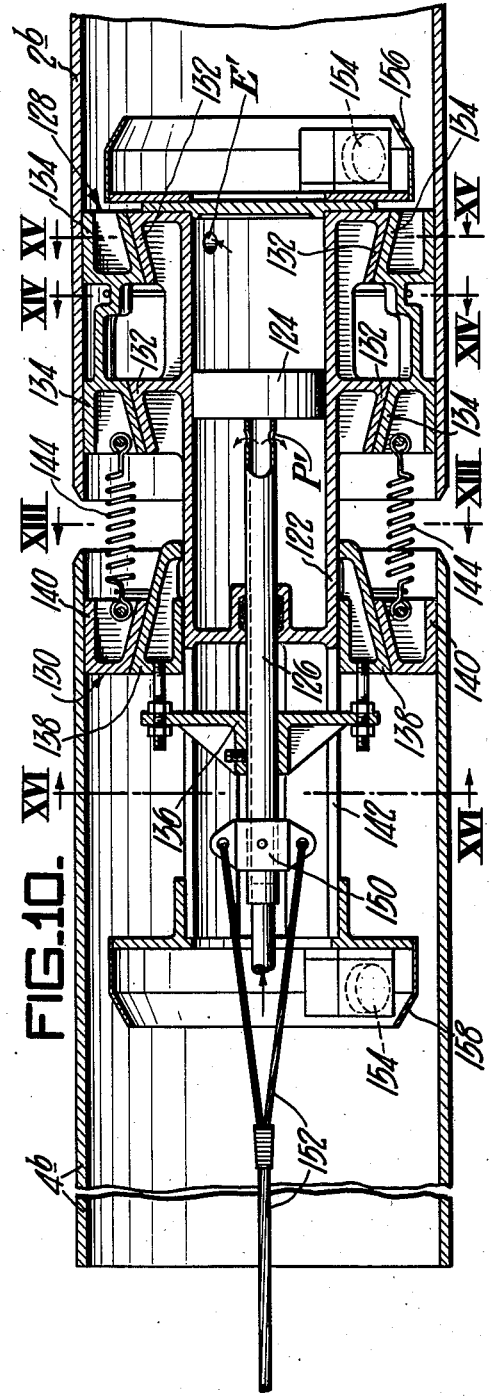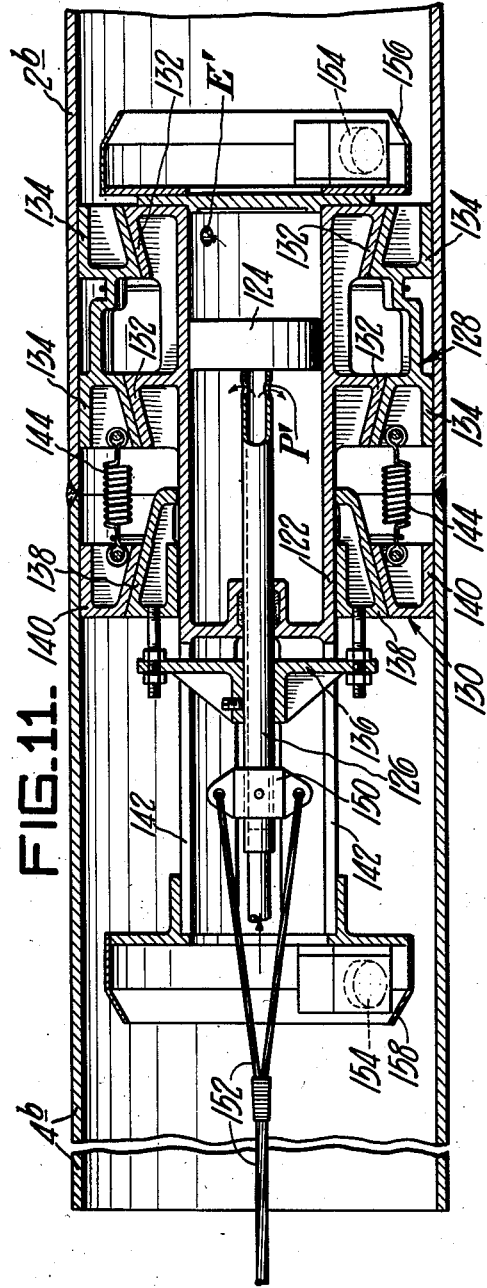

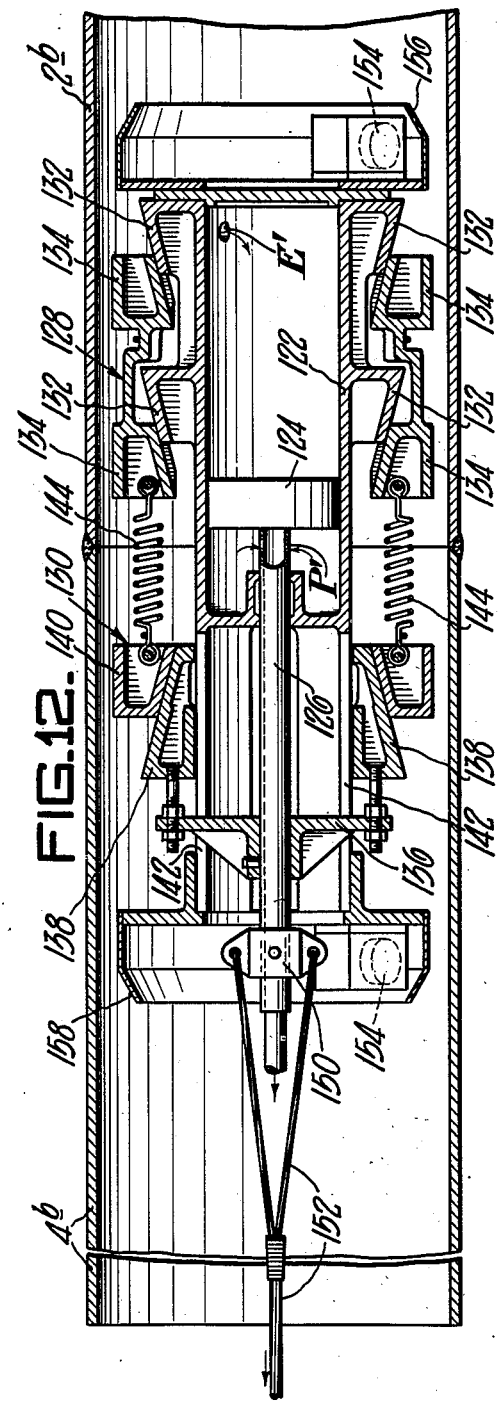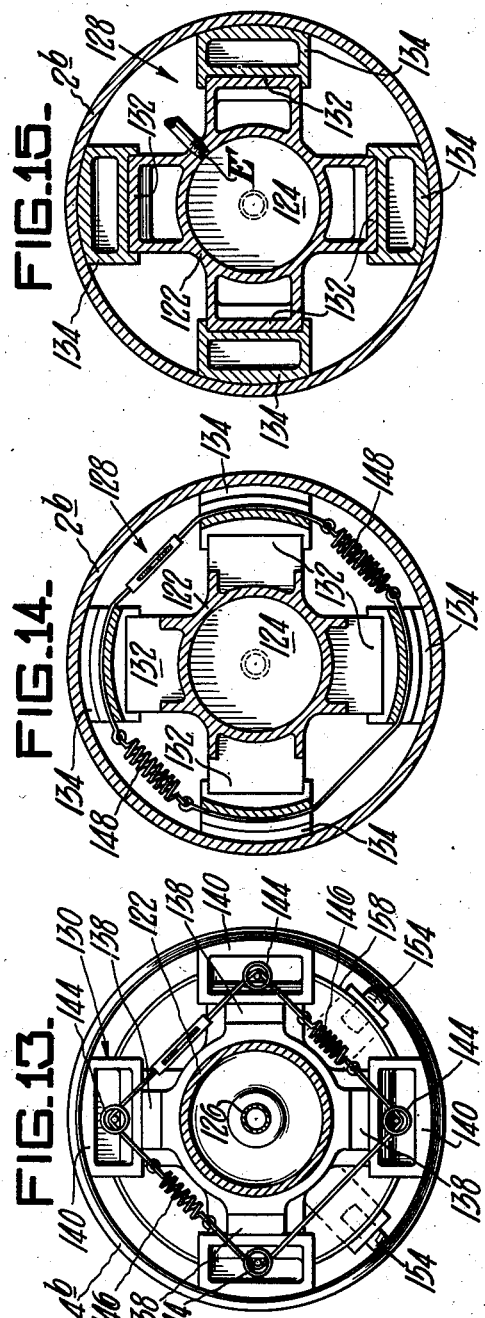

2,615,413

UNITED STATES PATENT OFFICE 2,615,413

INTERNAL PIPE ALIGNING CLAMP

Orlando P. Adams, McKeesport, Pa., and Raoul G. Mayer, Hendersonville, N. C., assignors to United States Steel Company, a corporation of New Jersey Application January 28, 1949, Serial No. 73,252

3 Claims. (Cl. 113—103)

This invention relates to pipe holding clamps and more particularly to collapsible interior fitting holding clamps for aligning and holding in position cylindrical sections to be joined together.

In the welding of pipe lines or the handling of a plurality of cylindrical sections there has always been present the problem of properly aligning the pipe or cylindrical sections to permit the joining thereof by a good weld or to facilitate the performance of any work thereon. Prior to our invention, both internal and external clamps had been used for this purpose but none of these possessed the desired property of being able to align sections whose ends were slightly out of round or at variance as to inside diameters, outside diameters or wall thicknesses. The devices of the prior art were suitable only for aligning perfectly round symmetrical sections.

In the handling of the many lengths of pipe necessary for long pipe lines it often happens that the open ends of some of the pipe become out of round or may even show some variation in inside or outside diameter.

In order to insure a good weld for joining a pipe section to a line pipe, it is essential, first of all, to align the axes of the two pieces of pipe to be joined and thereafter to round up the adjoining pipe ends as symmetrically as possible. Within our knowledge, no clamp of the prior art functioned to perform any other service except align the axes of the pipes to be joined. These clamps were incapable of compensating for any variation in the symmetry of the two pipe ends to be joined.

The pipe clamp we propose not only functions to align the pipe section concentric with the line pipe to be joined, but further, functions to round out the pipe section end to make it symmetrical with the line pipe end and actually moves the pipe section into abutting relation with the line pipe, thus insuring optimum conditions for welding.

It is accordingly an object of our invention to provide a clamp which permits proper alignment of a plurality of cylindrical sections.

It is further an object of our invention to provide a pipe clamping device which will permit positive alignment of pipe sections in an automatic manner.

Another object of our invention is to provide a mobile, collapsible, internal clamping device comprising dual clamps, concentrically supported, for aligning the axes of two cylindrical sections to be welded.

It is a further object of our invention to provide a clamping device which operates in a definite sequence to align cylindrical sections with each other, round out the adjoining ends of the cylindrical sections, and move and maintain the sections into abutting relation with each other for welding.

These and other objects will become more apparent after referring to the following specification and attached drawings, in which:

Figure 1 is a longitudinal sectional view showing one embodiment of our invention in expanded position ready to move the pipe section into abutting relationship with the line pipe;

Figure 2 is a view similar to Figure 1 but showing the clamp holding the pipes in position during welding;

Figure 3 is a view similar to Figures 1 and 2 but showing the clamp in collapsed condition ready to be withdrawn from the welded pipe;

Figure 4 is an end view of Figure 2 looking to the left;

Figure 5 is a longitudinal sectional view of a second embodiment of our invention in expanded position ready to move the pipe section into abutting relationship with the line pipe;

Figure 6 is a view similar to Figure 5 but showing the clamp holding the pipes in position during welding;

Figure 7 is a view similar to Figures 5 and 6 but showing the clamp in collapsed condition ready to be withdrawn from the welded pipe;

Figure 8 is a cross-section taken on the line VIII—VIII of Figure 5;

Figure 9 is a cross-section taken on the line IX—IX of Figure 5;

Figure 10 is a longitudinal sectional view of a third embodiment of our invention showing the clamp in expanded position ready to move the pipe section into abutting relationship with the line pipe;

Figure 11 is a view similar to Figure 10 but showing the clamp holding the pipes in position during welding;

Figure 12 is a view similar to Figures 10 and 11 but showing the clamp in collapsed condition ready to be withdrawn from the welded pipe;

Figure 13 is a cross-section taken on the line XIII—XIII of Figure 10;

Figure 14 is a cross-section taken on the line XIV—XIV of Figure 10;

Figure 15 is a cross-section taken on the line XV—XV of Figure 10; and

Figure 16 is a cross-section taken on the line XVI—XVI of Figure 10.

Referring more particularly to the drawings, reference numeral 2 indicates a line pipe to the end of which a pipe section 4 is to be welded. Positioned within the adjoining end portions of pipes 2 and 4 are a set of paired clamps 6 and 8. Extending concentrically through clamps 6 and 8 is an elongated tubular member 10. A threaded rod 12, having a right-hand thread, is fastened with its one end in the rearward end of tubular member 10 by a shrink fit. A threaded fulcrum nut 14 engages the threaded rod 12 adjacent its outer end. Rotatably mounted around tubular member 10 adjacent the threaded rod 12 is a fulcrum body 16. Transverse movement of fulcrum body 16 is prevented by means of collars 18 which are fixedly mounted around tubular member 10 adjacent each end of fulcrum body 16. Adjacent the fulcrum body 16 and spaced therefrom in the direction of the open end of line pipe 2 is another fulcrum body 20 slidably mounted around tubular member 10. Adjacent fulcrum body 20 is a hollow drum member 22 also slidably mounted around tubular member 10. Inner pipe wall surface contacting shoe members 24 are disposed radially around the fulcrum bodies. These shoe members are connected to the fulcrum bodies 16 and 20, the drum member 22, and fulcrum nut 14 by means of pivotally mounted connecting links 26. Links 28 connect fulcrum nut 14 and fulcrum body 20. Longitudinal movement of drum member 22 toward the rearward end of the tubular member 10 is limited by collar 29 which is mounted around the tubular member.

Slidingly mounted on the tubular member and telescoped within drum member 22 is a drum member 30. A compression spring 32 is provided between drum members 22 and 30 for urging the drum members away from each other. Longitudinal movement of drum member 30 toward the inner end of the tubular member is limited by collar 34 which is mounted around tubular member 10. A clutch 36, having a female portion 38, is mounted around the forward end of tubular member 10. The female portion 38 has a left-hand threaded sleeve 40 extending therefrom in the direction of drum member 30. A fulcrum nut 42 is mounted in threaded engagement around the sleeve 40. A rod 44 is secured to the forward end of tubular member 10 by a shrink fit. Rod 44 is provided with grooves 46 and 48. A ball 50, held in place by spring means 52, is provided to engage groove 46 or 48. The forward end of rod 44 is rectangularly shaped at 54 to fit into a correspondingly shaped opening 55 in the male portion 56 of clutch 36. A shaft 58 is fastened to the end of the male portion 56. Keyed to the end of shaft 58 is a hand-wheel 60 for rotating clutch 36. Inner pipe surface contacting shoe members 62 are radially disposed around the fulcrum nut 42 and drum member 30. These shoe members are connected to the fulcrum nut 42 and the drum member 30 by means of pivotally mounted connecting links 64.

In operation, the paired clamps 6 and 8 are inserted into line pipe 2 so that clamp 6 projects outwardly thereof. The pipe section 4, which is to be welded to line pipe 2, is placed over clamp 6 about two inches from the end of line pipe 2, as best can be seen in Figure 1. The male portion 56 of clutch 36 is then pulled to the left by means of hand-wheel 60 so that ball 50 engages groove 48. The rectangular portion 54 of rod 44 will now be engaged by the opening 55 of male portion 56 and teeth 57 disengaged from female portion 38, thus transmitting the rotary movement of hand-wheel 60 to rod 44 through shaft 58 and male clutch portion 56. Rotary movement of the rod 44 is then transmitted through tubular member 10 to the threaded rod 12. Rotation of rod 12 in a clockwise direction moves fulcrum nut 14 to the left, thereby transmitting the motion and power of fulcrum nut 14 by means of links 28 to fulcrum 20. While movement of fulcrum nut 14 causes fulcrum body 20 to move in the same direction, spring 32 resists any movement of drum member 22 in the same direction. The movement of threaded nut 14 is thus transmitted finally to shoe members 24 which are thereby expanded into inner pipe surface engagement by means of connecting links 26.

After clamp 8 has been expanded into inner pipe engaging position, male portion 56 and teeth 57 of clutch 36 are pushed to the right to engage female portion 38. This causes ball 50 to be positioned in groove 46. Clockwise rotation of hand-wheel 60 now rotates the threaded sleeve 40 to move fulcrum nut 42 to the right. During the movement of fulcrum nut 42 to the right, spring 32 prevents drum member 30 from moving in the same direction so that the motion and power of fulcrum nut 42 is transmitted through links 64 to raise shoe members 62 into inner pipe surface engagement.

By continuing the rotation of the hand-wheel 60 in the same direction, the shoe members 62 will act to round out the end of pipe section 4. Further clockwise rotation of hand-wheel 60 overcomes the resistance of spring 32 thereby moving section 4 to the right to close the two inch gap between its end and the end of line pipe 2 to properly position the pipes together for the welding operation.

When the welding operation has been completed the hand-wheel 60 is turned counter-clockwise to collapse clamp 6; then by moving the male portion 56 to the left to re-engage the rectangular portion 54 of rod 44 with portion 55 of male portion 56 and disengage teeth 57 from female portion 38, the clamp 8 will be collapsed by maintaining the same counter-clockwise rotation of hand-wheel 60. Now the entire device can be moved to the left to the end of pipe 66 on wheels 70 and be properly located to repeat the same operation with a new length of pipe.

In another embodiment of our invention, as shown in Figures 5 through 9, reference numeral 72 indicates a fluid pressure cylinder in which is slidingly fitted a piston 74 having a piston rod 76 extending rearwardly therefrom concentrically through paired clamps 78 and 80 which are positioned in the adjacent ends of pipe section 4a and line pipe 2a. Cylinder 72 is provided with a fluid inlet P through its side adjacent to its cylinder head 82 and another fluid inlet E through its outer end. A fulcrum block 84 is fixedly mounted around the rearward end of the piston rod 76. Slidably mounted around the piston rod 76 is a drum member 86 having a sleeve portion 88 extending toward fulcrum block 84. Fixedly mounted around sleeve portion 88 adjacent fulcrum block 84 is another fulcrum block 90. A slidably mounted fulcrum block 92 is provided around sleeve portion 88 adjacent fixed fulcrum block 90. Rigid links 94 connect fulcrum block 84 with fulcrum block 92. Inner pipe surface engaging shoe members 96 are disposed radially around the fulcrum bodies and are pivotally connected to the fulcrum bodies and drum member 86 by means of connecting links 98.

Intermediate drum member 86 and cylinder head 82 is a slidably mounted drum member 100. Disposed between drum member 100 and drum member 86 is a compression spring 102 adapted to urge the drum members away from each other. Another compression spring 104 is disposed between drum member 100 and cylinder head 82. Spring 104 is weaker than spring 102 but is sufficiently strong to urge drum member 100 away from cylinder head 82. Inner pipe surface engaging shoe members 106 are disposed radially around cylinder head 82 and drum member 100. Shoe members 106 are connected with cylinder head 82 and drum member 100 by means of pivotally mounted connecting links 108 extending through slots 109 in sleeve 110.

The slotted circular sleeve 110 is provided to relieve the piston rod 76 and other parts from any excessive bending stress. The sleeve 110 fits slidingly over the cylinder 72 and the drum member 100 and is fastened to drum member 86.

Affixed to the forward end of clamp 78 are two spaced-apart hooks 112 to which are attached the split ends of a rope or cable 114. The forward end of rope 114 extends through pipe section 4a and is used to pull the clamp device through the pipe section after the welding operation has been completed. To facilitate movement of the device within the pipes, two rollers 116 are provided on the rearward and forward ends thereof. The ends of the device are also provided with projecting, angularly bent guards 118 which protect the device from possible damage while it is being transported within the pipes.

In operation, when fluid pressure is applied through the cylinder inlet P, the piston 74 will be moved to the left, while the cylinder 72, due to the combined resistances of the springs 102 and 104 acting on the cylinder head 82, will remain stationary. Fulcrum block 84 being fixedly mounted to the end of the piston rod 76 will move to the left therewith. By means of connecting links 94, the motion and power of block 84 is transmitted to the fulcrum block 92 which is slidably mounted on the sleeve portion 88 of drum member 86.

By reason of the resistance of springs 102 and 104, the drum sleeve 88 and the attached fulcrum block 90 remain stationary. Therefore, the fluid pressure at P causes the piston rod 76 to move to the left sliding inside the drums 86 and 100. The power and motion of fulcrum blocks 84 and 92 thereby raise the shoe members 96 into engagement with the inner wall surface of line pipe 2a through the combined action of the pivotally mounted connecting links 98. Clamp 80 is then in expanded condition and piston 74 and piston rod 76 are locked in position.

Now the pipe section 4a is placed in position over clamp 78, which is still collapsed, at a distance of about two inches from the end of line pipe 2a. The fluid pressure in the cylinder 72, at P, is then increased until it overcomes the resistance of spring 104. This causes the cylinder 72 to move to the right as the piston 74 remains stationary in locked position. Spring 102, having a greater resistance to compression than spring 104, causes the drum member 100 to remain stationary while cylinder head 82 overcomes the resistance of spring 104 and moves to the right. Thus the movement of cylinder head 82 toward drum 100 will be transmitted to inner wall contacting shoe members 106, through the links 108, and bring them into contact with the inner surface of pipe 4a. This will cause the pipe 4a to be made concentric with the cylinder 72 and aligned with the line pipe 2a, since the piston 74 and the piston rod 76 are already concentric with the inside diameter of pipe 2a as a result of the first operation.

After shoe members 106 have contacted the inner wall of pipe section 4a, continuing pressure at P will round out the end of pipe 4a and make it symmetric with the end of line pipe 2a.

Increasing the pressure in the cylinder at P will overcome the resistance of spring 102 and thereby move the pipe 4a to the right closing the gap and properly positioning the pipes for welding.

To maintain the desired spacing between the shoe members 96, ring segments 120 are provided. These ring segments are attached to the shoes, as best shown in Figure 9. At each end of each segment a slot 121 is provided to allow for the expansion and collapse of clamp 80.

When the welding of the joint is completed the fluid pressure is relieved at P and then applied at E. This will cause the cylinder 72 to move to the left and the piston 74 to the right, thus collapsing both clamp 78 and 80 at the same time.

By means of the rope 114 the device can now be moved to the open end of the pipe section 4a and so located that the same operations as described above can be repeated.

In a third embodiment of our invention, shown in Figures 10 through 16, reference numeral 122 indicates a fluid pressure cylinder having slidably fitted therein a piston 124 which has a hollow piston rod 126 extending forwardly therefrom. As shown in Figure 10, cylinder 122 extends concentrically through clamps 128 and 130. Projecting from the outer circumference of cylinder 122 are integral wedge shaped bodies 132. Inner pipe surface engaging shoe members 134 are mounted around wedge shaped bodies 132. A radially extending hub member 136 having wedge shaped bodies 138 affixed thereto is fixedly mounted around piston rod 126 adjacent cylinder 122. Inner pipe surface contacting shoe members 140 are mounted around wedge shaped bodies 138. Wedge shaped bodies 138 are adapted to slide over the outer surface of cylinder 122 and guide means 142, which abuts the cylinder 122.

Compression springs 144 are disposed between shoe members 140 and 134 for urging the shoe members away from each other. Circumferentially disposed tension springs 146 and 148 are provided to hold the shoe members 140 and 134 in contact with the wedge shaped bodies 138 and 132. Fluid inlet E' is provided in the side of cylinder 122 and fluid inlet P' is provided in the side of the hollow piston rod 126 adjacent piston 124. A flange or clamp member 150 is fixedly mounted around piston rod 126 adjacent its outer end. Attached to flange member 150 is a rope 152 which extends through pipe section 4b.

To facilitate movement of the device within the pipes, two rollers 154 are affixed to each end thereof. Projecting from the ends of the device and bent angularly away therefrom are guards 156 and 158 which protect it from possible injury while it is being transported.

In operation, the device is positioned within the end of line 2b with clamp 130 projecting outwardly therefrom. Pipe section 4b is then placed over clamp 130 approximately two inches away from the end of line pipe 2b. The free end of the rope 152 is then securely fastened at the outer end of the pipe section 4b, to prevent the movement of piston 124 to the right when fluid pressure is applied in the cylinder at P'. When fluid pressure is applied at P', the cylinder 122, with attached wedge bodies 132, moves to the left and thus expands the shoes 134 until they contact the inside surface of pipe 2b. This contact prevents any further motion of cylinder 122 and positions the cylinder concentric with the inside surface of the pipe 2b.

At this time the clamp 130 is still collapsed and in order to bring about its expansion the far end of rope 152 is loosened to allow the piston 126 to move to the right under the fluid pressure applied at P'. The hub 136 being fixedly mounted on the piston rod 126, the motion of the piston 124 is transmitted to the attached wedge shaped bodies 138 which slide on the outer surface of cylinder 122. The movement of wedge shaped bodies 138 raises shoe members 140 until they contact the inside surface of pipe section 4b and thus position pipe 4b concentric with the line pipe 2b.

Increasing the pressure in the cylinder at P' will overcome the resistance of springs 144 and cause the shoes 140 to round out the end of pipe 4b and then move it to the right closing the gap between its end and the end of line pipe 2b and properly position the pipes for welding.

When the welding of the joint is completed the fluid pressure in cylinder 122 is relieved at P' and then applied at E'. This causes the cylinder 122 to move to the right and the piston rod 126 to the left, thus collapsing both clamps 128 and 130 at the same time.

By means of rope 152, the device can now be moved to the outer end of pipe section 4b and so located that the same operations as described above can be repeated.

The three embodiments of our invention described herein are usually used in the field for aligning standard 20 to 40 foot pipe sections for welding to line pipe. Their use, however, is not limited to the long standard pipe lengths; they can also be used for effectively aligning and clamping together shorter pipe lengths.

Although we have described our invention as being used for aligning and clamping pipe sections, it is not intended to convey that its utility is limited to pipe sections. It can be used for aligning two or more cylindrical sections of any type of material, e. g., cement pipe which is currently being utilized in the oil fields to augment scarce steel pipe.

While several embodiments of our invention have been shown and described it will be apparent that other adaptations and modifications may be made without departing from the scope of the following claims.

We claim:

1. A pipe holding device for holding a pipe section in alignment with a line pipe comprising a pair of expansible inner pipe holding clamps, one of said clamps being adapted to fit into the end of said line pipe and the other clamp being slidingly adapted to fit into the adjoining end of said pipe section, a fluid pressure cylinder mounted with its head adjacent said pipe section fitting clamp, a piston having a piston rod projecting therefrom slidingly fitted within said cylinder, said piston rod extending concentrically through said clamps, a pair of spaced drum members fitted slidingly around said piston rod intermediate said clamps, resilient means between said drum members for urging said members away from each other, resilient means intermediate said cylinder head and the drum member adjacent said cylinder head for urging said drum member away from said cylinder head, said second named resilient means being weaker than said first named resilient means, said line pipe fitting clamp consisting of at least one fulcrum body mounted fixedly around said piston rod adjacent its end, a plurality of fulcrum bodies mounted fixedly around the drum member adjacent said first named fulcrum body, a plurality of inner pipe surface contacting shoe members disposed radially around said fulcrum bodies and spaced therefrom by means of pivotally mounted connecting links, said fulcrum bodies being adapted to raise said shoe members into inner pipe wall engagement upon longitudinal movement of said piston rod, said piston being adapted to move longitudinally under fluid pressure applied within said cylinder, said pipe section fitting clamp consisting of at least one fulcrum body affixed to said cylinder head, one fulcrum body affixed to the drum member adjacent said cylinder head and a plurality of inner pipe surface contacting shoe members disposed radially around said fulcrum members and spaced therefrom by means of pivotally mounted connecting links, said fulcrum bodies being adapted to raise said shoe members into inner pipe wall engagement upon longitudinal movement of said cylinder against the resistance of said second named resilient means after said line pipe fitting clamp has been expanded into inner pipe wall engagement, said movement of the cylinder head being operable to compress said first named resilient means and move said clamps toward each other after said clamps have been expanded into pipe engaging position to thereby bring said pipe section into abutting relation with said line pipe, and means affixed to said clamps and extending to beyond the free end of said pipe section for withdrawing said clamps after said pipe section and said line pipe have been joined.

2. A pipe holding device for holding a pipe section in alignment with a line pipe comprising a pair of expansible inner pipe holding clamps, one of said clamps being adapted to fit into the end of said line pipe and the other clamp being slidingly adapted to fit into the adjoining end of said pipe section, a fluid pressure cylinder mounted with its head adjacent said pipe section fitting clamp, a piston having a piston rod projecting therefrom slidingly fitted within said cylinder, said piston rod extending concentrically through said clamps, a pair of spaced drum members fitted slidingly around said piston rod intermediate said clamps, resilient means between said drum members for urging said members away from each other, resilient means intermediate said cylinder head and the drum member adjacent said cylinder head for urging said drum member away from said cylinder head, said second named resilient means being weaker than said first named resilient means, said line pipe fitting clamp consisting of at least one fulcrum body mounted fixedly around said piston rod adjacent its end, a plurality of fulcrum bodies mounted fixedly around the drum member adjacent said first named fulcrum body, a plurality of inner pipe surface contacting shoe members disposed radially around said fulcrum bodies and spaced therefrom by means of pivotally mounted connecting links, said fulcrum bodies being adapted to raise said shoe members into inner pipe wall engagement upon longitudinal movement of said piston rod, said piston being adapted to move longitudinally under fluid pressure applied within said cylinder, said pipe section fitting clamp consisting of at least one fulcrum body affixed to said cylinder head, one fulcrum body affixed to the drum member adjacent said cylinder head and a plurality of inner pipe surface contacting shoe members disposed radially around said fulcrum members and spaced therefrom by means of pivotally mounted connecting links, said fulcrum bodies being adapted to raise said shoe members into inner pipe wall engagement upon longitudinal movement of said cylinder against the resistance of said second named resilient means after said line pipe fitting clamp has been expanded into inner pipe wall engagement, said movement of the cylinder head being operable to compress said first named resilient means and move said clamps toward each other after said clamps have been expanded into pipe engaging position to thereby bring said pipe section into abutting relation with said line pipe, and means affixed to said clamps and extending to beyond the free end of said pipe section for withdrawing said clamps after said pipe section and said line pipe have been joined.

3. A pipe holding device for holding a pipe section in alignment with a line pipe comprising a pair of connected expansible inner pipe holding clamps, one of said clamps being adapted to fit into the end of said line pipe and the other clamp being adapted to fit into the adjoining end of said pipe section, a fluid pressure cylinder mounted with its head adjacent said pipe section fitting clamp, a piston having a piston rod projecting therefrom slidingly fitted within said cylinder, said piston rod projecting through said head and extending concentrically through said clamps, a pair of spaced drum members slidingly fitted around said piston rod intermediate said clamps, resilient means intermediate said drum members for urging said members away from each other, resilient means intermediate said cylinder head and the drum member adjacent said cylinder head for urging said drum member away from said cylinder head, said second named resilient means being weaker than said first named resilient means, a tubular member having longitudinal slots in the walls thereof surrounding said drum members and the head of said cylinder, said clamps consisting of a plurality of fulcrum bodies disposed around said piston rod at spaced intervals, a plurality of inner pipe surface contacting shoe members spaced radially around said fulcrum bodies and said drum members and connected therewith by pivotally mounted connecting links, said links passing through the slots in said tubular member, said fulcrum bodies being adapted to be moved longitudinally to thereby raise said shoe members into inner pipe surface engagement, said cylinder and piston rod being adapted to move said fulcrum bodies to expand said clamps, the resistance of said resilient means providing a fulcrum against which said line pipe fitting clamps may be expanded into inner pipe wall engagement, and means for providing fluid pressure within said cylinder, said clamps being expanded by the movement of said piston rod when pressure is applied on the piston within said cylinder, the continued application of pressure after said clamps have been expanded being operable to move said pipe section fitting clamp toward said line pipe fitting clamp to thereby bring said pipe section into abutting relation with said line pipe.

ORLANDO P. ADAMS.
RAOUL G. MAYER.

REFERENCES CITED

The following references are of record in the file of this patent:

UNITED STATES PATENTS

| Number | Name | Date |
|---|---|---|
| 1,166,284 | Vroman | Dec. 28, 1915 |
| 2,167,338 | Murcell | July 25, 1939 |
| 2,167,886 | Graham | Aug. 1, 1939 |
| 2,272,698 | Garrett | Feb. 10, 1942 |
| 2,344,939 | Bennett | Mar. 28, 1944 |
| 2,413,103 | Forbes (B) | Dec. 24, 1946 |
| 2,429,053 | Forbes (A) | Oct. 14, 1947 |
| 2,460,325 | Whitson | Feb. 1, 1949 |
| 2,525,680 | Ingermarson | Oct. 10, 1950 |